2,892,731

ADHESIVES CONTAINING KAOLIN

Arlie Wade Claxton, Irwinton, Ga., assignor to Minerals & Chemicals Corporation of America, Philadelphia, Pa., a corporation of Maryland No Drawing. Application October 8, 1954
Serial No. 461,281

15 Claims. (Cl. 106—208)

This invention relates to improved adhesives of the type used by the paper-converting industry in the manufacture of packaging materials such as, for example, corrugated board, solid fibre (laminated) board, paper bags, and spiral-wound tubes and cores.

Amylaceous adhesives, i.e. adhesives of starch and of starch derivatives such as dextrine, are widely used in the fibre box industry; starch being employed chiefly for the combining of corrugated boards, and dextrine and other starch derivates for laminating solid fibre boards. Protein adhesive and resin adhesives, such as polyvinyl alcohol adhesives, are also employed in the manufacture of fibre packaging materials. In addition, the fibre packaging material idustry sometimes employs mixtures of the above mentioned adhesives or mixtures of some of them with sodium silicate.

Adhesive formulas usually include in addition to the adhesive material itself at least one other ingredient and sometimes as many as four or five, as is well known to those skilled in the art. For example, the starch adhesive used in the well-known Stein-Hall process for combining corrugated board usually contains caustic soda, borax and a preservative along with the starch. Clays of various types have long been used in adhesive formulation as extenders, primarily for the purpose of lowering costs, although in some cases the clay has imparted certain desirable characteristics to the adhesive.

In use, adhesives such as those described herein are of necessity always accompanied by substantial amounts of water, since the viscosity of the paste mixes must be such as to assure optimum spreading conditions. These adhesives have a tendency to penetrate into the board or paper being treated, and when this penetration is excessive wastage of adhesive and sogginess of the product result. A soggy product is undesirable primarily in that it leads to slowdown of production, etc. Heretofore a number of materials have been utilized as adhesive "blocking agents" in an attempt to retard penetration, among which are clays of various types, diatomaceous earth and algin derivatives. None of these materials previously used has been entirely satisfactory for various reasons. Thus, in some cases the "blocking agent" is relatively ineffective in reducing penetration. In other cases, while penetration may be substantially reduced, the amount of the "blocking agent" required to accomplish this or the character of the "blocking agent" is such that other desirable characteristics normally possessed by the adhesive are adversely affected to the extent that the resulting adhesive is not commercially acceptable.

Accordingly, one object of the invention is to provide a means for overcoming the aforementioned difficulties.

Another object of the invention is to provide a means for improving adhesive compositions of the type herein described so as to control the penetration of the adhesive into the paper or board on which it is used, without adversely affecting the normal desirable characteristics thereof.

A further object is to provide an improved adhesive of a composition such that excessive penetration with its attendant disadvantages is avoided.

Other objects and features of the invention will be apparent from the detailed description and examples which follow.

I have discovered that refined kaolin clay of a particular particle size range, as hereinafter specified, is especially superior to "blocking agents" heretofore used, including kaolins not falling within the said particle size range, for controlling penetration of adhesives. The refined kaolin clay of my invention is particularly suitable for improving the characteristics of the well-known amylaceous type adhesive and resin adhesives, such as polyvinyl alcohol compositions, as well as mixtures thereof. While the principal ingredients of my novel adhesive compositions are the adhesive material itself and said refined kaolin clay, it is to be specifically understood that my invention comprehends, if desired, the inclusion of one or more additives commonly employed in adhesive compositions, which additives serve particular purposes as is well known to those skilled in the art.

Mined kaolin clays are customarily refined for industrial usage by removing abrasive grit, as exemplified by plus-325-mesh material, therefrom. These refined clays frequently have particle size distributions such that 50% or more, sometimes even as much as 80% or 90%, consists of particles under 2 microns in size. These clays have been used extensively in adhesives as extenders. The refined clay which I have discovered to be particularly beneficial in blocking adhesive penetration is kaolin substantially free of grit and having a particle size distribution such that not over 30% by weight consists of particles finer than 2 microns in equivalent spherical diameter and not more than 15% by weight consists of particles finer than 1 micron in size. As will be illustrated by the examples which follow, refined kaolin clay of the aforesaid size distribution is superior to finer clays in blocking action. This result is unexpected in that it would seem logical for blocking action to increase inversely with clay particle size. Thus, in filtering operations, either commercially such as with rotary vacuum filters or on a laboratory scale using filter paper, water is separated much more readily from the coarser kaolin of my invention than from a finer particle size kaolin. This would lead one to believe that the finer particle size kaolin forms a more impenetrable "mat" than such coarser kaolin, and that they would behave similarily in adhesive compositions.

Numerous advantages are derived from the ability to reduce penetration of the adhesives by the incorporation therein of the refined kaolin having the particle distribution above set forth. In the case of corrugated adhesives, some of these advantages are production of drier, firmer boards; reduction in warping and "wash-boarding"; and increased production on all weight liners, particularly so on heavy liners; and increased mileage per gallon of adhesive. In the case of solid fibre laminating adhesives, the advantages include production of drier, firmer boards; reduction in warping; increased machine speeds; and increased mileage per gallon of adhesive. Another important advantage of the use of the kaolin of my invention in solid fibre laminating adhesives is that its use leads to flow properties which make possible the application of smoother, thinner films. Bag seam and end flap starch adhesives of my invention give increased mileage; faster set of adhesive; and reduction or elimination of strike-through of adhesive. Finally, among the advantages in the case of textile tube and core dextrine adhesives are increased mileage; and drier, firmer tubes and cores.

The refined kaolin for use in the adhesive compositions of my invention is produced from raw kaolin by substantially removing grit, i.e. material coarser than 325 mesh, and separating from the degritted kaolin a sufficient quantity of the finer kaolin particles, by any of the numerous methods well known to those skilled in the art, to yield a coarser degritted kaolin product having a particle size distribution such that not over about 30% by weight consists of particles finer than 2 microns in equivalent spherical diameter and not more than 15% by weight consists of particles finer than 1 micron. Thus, the refined kaolin suitable for the purposes of my invention comprises a degritted kaolin having a particle size distribution such that at least 70% consists of particles larger than 2 microns, and not more than 15% by weight consists of particles finer than 1 micron. Preferably from 75 to 85% of the degritted kaolin should be larger than 2 microns.

As above mentioned the refined kaolin clay suitable for my invention may be obtained from raw kaolin by physical separation and classification well known to those skilled in the art. Thus, the separation and recovery of the desired clay fraction from raw clay, for example, may be accomplished by any suitable combination of screening, thickening, filtration, sedimentation, flotation, and other similar operations.

For the purpose of the present invention the particle size distribution of kaolin is determined by sedimentation methods well known to those skilled in the art. Specifically, there may be used for this determination the Casagrande method described in Journal of the American Ceramic Society, vol. 21, pages 89–97 (1938).

The amount of the refined kaolin to be used in the novel adhesive compositions of my invention may vary over a relatively wide range depending, among other things, on the type of paper on which the adhesive composition is to be used, the nature of the adhesive material itself, and the flow properties and other characteristics desired of the finished adhesive composition. Thus, the ratio of the refined kaolin to the adhesive material may range from about 1:10 to about 4:1, and the optimum amount in any particular case may be readily determined by test and observation. In the case of starch corrugating adhesives, I have found that about one part of the refined kaolin for each four or five parts of the starch material is satisfactory. In the case of dextrine laminating adhesives, about 30% of refined kaolin based on the combined weight of the adhesive material and the kaolin is usually sufficient. A much greater quantity of the refined kaolin is desirable in the polyvinyl alcohol type of adhesive, such as about one to four parts of the kaolin to one part of the polyvinyl alcohol. For an adhesive including a mixture of dextrine and polyvinyl alcohol as the adhesive material, about 30% clay based on the combined weight of the dextrine and resin is usually sufficient.

The adhesives with which my invention are concerned are employed as aqueous pastes which can be prepared from the dry compositions by methods in common usage today for that purpose. The type of adhesive used in the aforementioned Stein-Hall process contains starch in two forms—gelatinized, to act as a carrier, and raw or ungelatinized to form the bond through gelatinization and, therefore, act as the adhesive. The gelatinized starch is used to adjust the paste viscosity to a workable level and keep the raw starch in suspension until application to the tips of the corrugating medium, after which the raw starch is gelatinized by heat, supplied by the combiner, and chemical action and thus sets to form a strong bond "in situ." One way of preparing a Stein-Hall type paste is to use two mixing tanks, one for the carrier and the other for the raw starch slurry. In one tank (#1) starch, sodium hydroxide and the refined kaolin are mixed with water (during which the temperature is brought to about 160° F. and the starch is gelatinized) to form the carrier. The function of the sodium hydroxide is to control the temperature of gelatinization of the final mix, i.e., the temperature necessary to cause the adhesive to "set" on the flutes of the corrugating medium. In the other mixing tank (#2), starch, borax and cold water are mixed to a smooth consistency. The contents of tank #1 are added to those of tank #2 with agitation, until the desired viscosity is reached; formaldehyde is then added and the mix is ready for storage or use. The borax serves a twofold function: (1) it combines with the carrier to increase its viscosity and improve its fluidity characteristics after vigorous agitation and (2) it reacts with the raw starch as it is being gelatinized on the machine resulting in a faster adhesive setting rate. Formaldehyde prevents souring in hot weather and mold growth on the starch film applied to the board. There are, of course, many other ways of formulating a Stein-Hall paste, including the use of only one mixing tank for the purpose.

Laminating board adhesives of the present invention are easily formulated from dextrine, the refined kaolin and water. Dextrine is a roasted starch which has been converted thereby to a form which combines readily with water. Dextrine paste can be prepared by cooking the dextrine in water, after thorough mixing, to a temperature of 195° F. and then cooling it fairly rapidly to a temperature fixed by the optimum viscosity required by the particular board to be combined, in the light of the existing mechanical conditions. The refined kaolin in the desired amount can be stirred into the dextrine-water mixture.

In making up a polyvinyl alcohol paste, a simple procedure comprises slurrying a dry mixture of polyvinyl alcohol and refined kaolin in cold water, heating the slurry with live steam at 170°–180° F. and then allowing the mixture to cool to room temperature. When making a paste of a combination of polyvinyl alcohol and starch, the dry ingredients (starch, polyvinyl alcohol and refined kaolin) can be stirred in cold water to a lump-free slurry and the slurry then heated at about 180° F. with live steam after which it can be cooled for usage.

Known tests for measuring penetration of adhesives or slurries of "blocking agents" appear to be inadequate. Perhaps the two most common such tests are one involving the use of an ordinary blotter and the other employing standard filter paper. In the former, a drop of water is placed on the blotter and beside it, another drop of water containing some of the additive to be tested— the comparison of "soaking in" time is supposed to give an indication of the blocking action of the additive. In the latter test, the adhesive is filtered through a standard filter paper, the quantity of filtrate in a given time being taken as an indication of the extent of penetration of said adhesive. Obviously, these tests are simply an indication of water retentive capacity and fail to allow for the time-pressure conditions found in commercial processes. In view of this situation, the test described below was developed to measure adhesive penetration. The test employed for measuring penetration characteristics of the adhesive and which simulates actual operating conditions is conducted as follows. A measured quantity of adhesive is placed upon the topmost of a stack of five or six sheets of a standard filter paper and the stack is then subjected to a pressure of 100 p.s.i. in a hydraulic press for 30 seconds. After the pressure is released, each sheet of the filter paper is stained by an indicator reagent appropriate for the adhesive under consideration. Thus, the maximum depth of penetration and the amount of adhesive present at various depths are clearly shown by this test. A variation of this test procedure, which I sometimes use, substitutes a dropping weight for the pressing operation (a piece of bar stock 1 inch in diameter and weighing 1½ pounds being dropped 31 inches onto the filter paper stack).

Following are examples which illustrate the superiority of refined kaolin of the particle size range specified over other materials used as extenders and/or "blocking agents" in adhesives. It should be clearly understood that the invention is not limited to the particular adhesive compositions mentioned in these examples.

EXAMPLE I

Dry compositions of Pen Ford Gum #12, a dextrine made by Penick & Ford, Ltd. which is used as a laminating adhesive for solid fibre board, and various extenders were dispersed in water to produce a number of adhesive mixes all of which were then tested by the described pressure penetration method for evaluations of the extenders as "blocking agents." The penetration results are each given as an integer and a decimal, the integer representing the number of sheets of filter paper fully penetrated and the decimal representing the fraction of total staining on the following sheet. This fraction is an estimate based on the assumption that each of the penetrated sheets represents total staining. Thus a result of 3.4 indicates full penetration of 3 sheets and 0.4 staining of the fourth one. The following adhesive formulas were tested, all parts being given by weight.

Formula 1

| | Parts |
|---|---|
| Pen Ford Gum #12 | 70 |
| Water | 150 |

Formula 2

| | |
|---|---|
| Pen Ford Gum #12 | 70 |
| ASP 400 kaolin | 30 |
| Water | 150 |

Formula 3

| | |
|---|---|
| Pen Ford Gum #12 | 70 |
| Finer kaolin clay | 30 |
| Water | 150 |

Formula 4

| | |
|---|---|
| Pen Ford Gum #12 | 70 |
| Diatomaceous earth | 30 |
| Water | 150 |

Formula 5

| | |
|---|---|
| Pen Ford Gum #12 | 70 |
| Fuller's earth | 30 |
| Water | 150 |

Formula 6

| | |
|---|---|
| Pen Ford Gum #12 | 70 |
| Airfloat clay | 30 |
| Water | 150 |

Formula 7

| | |
|---|---|
| Pen Ford Gum #12 | 70 |
| Bentonite | 30 |
| Water | 150 |

Formula 8

| | |
|---|---|
| Pen Ford Gum #12 | 70 |
| Kelsize | 2.2 |
| Water | 150 |

The ASP 400 kaolin of Formula 2, which is a product of the Edgar Division of Minerals & Chemicals Corporation of America and is within the particle size distribution limits of my invention, and the finer kaolin clay of Formula 3, which is without the limits of my invention, have been refined and have the following weight percentages of particles.

| Clay Product | 2 to 30 Microns | Minus-2-microns | Minus-1-micron |
|---|---|---|---|
| | Percent | Percent | Percent |
| ASP 400 | 76 | 23 | 12 |
| Finer kaolin clay | 7 | 93 | 75 |

The "airfloat clay" of Formula 6 was from a sample of South Carolina airfloated crude clay. This clay was relatively gritty, but it was finer than ASP 400, containing about 45% minus-2-micron material and about 32% minus-1-micron size particles.

Kelsize (Formula 8) is the trade name for a sodium derivative of algin manufactured by the Kelco Company. Penetration test results are tabulated below:

| Formula No. | Extender | Penetration Rating |
|---|---|---|
| 1 | None | 3.95 |
| 2 | ASP 400 | 2.50 |
| 3 | Finer kaolin clay | 3.50 |
| 4 | Diatomaceous earth | 3.06 |
| 5 | Fuller's earth | 3.15 |
| 6 | Airfloat clay | 3.40 |
| 7 | Bentonite | 3.35 |
| 8 | Kelsize (algin) | 3.70 |

Whatman No. 4 filter paper was used for all penetration tests described herein.

It can be readily seen from the above table that ASP 400, which is a refined kaolin having the particle size distribution suitable for my invention, is superior to all other extenders tested in blocking ability. Specifically, it will be noted that the extent of penetration of the adhesive composition of my invention (Formula 2) was markedly less than the adhesive containing the finer kaolin clay (Formula 3), the latter penetrating 40% more than the adhesive of my invention. Bentonite and airfloat clay permitted 34% and 36% greater penetration, respectively, than ASP 400 and Kelsize, 48% greater penetration.

EXAMPLE II

In this example, ASP 400 was compared to diatomaceous earth in conjunction with a starch bag seam adhesive. The following two adhesive formulas were prepared from the dry compositions and tested for penetration as were those of Example I (the portions are by weight).

Formula 1

| | Parts |
|---|---|
| No. 512 Gum | 66.5 |
| Aqua Fill | 16.7 |
| Water | 166.7 |

Formula 2

| | |
|---|---|
| No. 512 Gum | 66.5 |
| ASP 400 | 16.7 |
| Water | 166.7 |

The No. 512 gum is a starch gum sold by Penick & Ford, Ltd.; the Aqua Fill, a diatomaceous earth product. Penetration ratings were:

| | |
|---|---|
| Formula 1 | 3.05 |
| Formula 2 | 2.1 |

This example demonstrates the superiority of ASP 400 over diatomaceous earth as a "blocking agent" in a gum bag seam adhesive.

EXAMPLE III

In this example ASP 400 was compared with Kelsize in a corrugated board adhesive. The following two compositions were prepared and tested for penetration by the aforementioned drop (instead of pressure as in Examples I and II) method.

Formula 1

| | Parts |
|---|---|
| Douglas corrugating starch | 60.9 |
| NaOH | 1.98 |
| Borax | 1.66 |
| ASP 400 | 16.80 |
| Water | 244.50 |

Formula 2

| | |
|---|---|
| Douglas corrugating starch | 60.9 |
| NaOH | 1.98 |
| Borax | 1.66 |
| Kelsize | 0.609 |
| Water | 244.50 |

Penetration ratings were:

Formula 1 ........................................... 2.7
Formula 2 ........................................... 3.3

This example illustrates the superiority of ASP 400 over an algin derivative as a "blocking agent" in a corrugated board adhesive.

EXAMPLE IV

In this example ASP 400 was compared with the South Carolina airfloated clay of Example I in a polyvinyl alcohol corrugated board adhesive. The following two compositions were prepared (based on a disclosure in U.S. Patent 2,413,570 to Krister et al.) and tested for penetration.

*Formula 1*

| | Parts |
|---|---|
| Elvanol 72–51 | 30 |
| ASP 400 | 70 |
| Water | 370 |

*Formula 2*

| | Parts |
|---|---|
| Elvanol 72–51 | 30 |
| Airfloat clay | 70 |
| Water | 370 |

Elvanol 72–51 is a polyvinyl alcohol—a product of E. I. du Pont de Nemours & Company.

Penetration ratings were:

Formula 1 ........................................... 2.2
Formula 2 ........................................... 3.2

This example illustrates the blocking superiority of ASP 400 over an airfloated clay in a resin adhesive.

EXAMPLE V

In this example ASP 400 was used in an adhesive comprising a mixture of dextrine and polyvinyl alcohol. The following composition was prepared and tested for penetration.

| | | |
|---|---|---|
| Pen Ford Gum 280 | gm | 76 |
| Elvanol 7260 | gm | 2.0 |
| ASP 400 | gm | 40.0 |
| Water | ml | 292 |

Pen Ford Gum 280 is a dextrine product of Penick & Ford, Ltd. and Elvanol 7260 a polyvinyl alcohol sold by E. I. du Pont de Nemours & Company.

The adhesive composition penetrated to the 3rd sheet.

EXAMPLE VI

In this example ASP 400 clay was substituted for Kelsize (an algin derivative) in starch corrugating adhesives and tested on a commercial scale. The clay was used in place of the Kelsize in the two following formulas (200 lb. of clay in place of 12 lb. of Kelsize) which represent adhesives in actual plant usage.

*Formula 1 (single facer)*

| | | |
|---|---|---|
| Water | gal | 200 |
| Kelsize | lb | 12 |
| Starch (carrier) | lb | 125 |
| NaOH | lb | 29 |
| Water | gal | 330 |
| Starch (raw) | lb | 975 |
| Borax | lb | 29 |

*Formula 2 (double backer)*

| | | |
|---|---|---|
| Water | gal | 200 |
| Kelsize | lb | 12 |
| Starch (carrier) | lb | 150 |
| NaOH | lb | 32 |
| Water | gal | 330 |
| Borax | lb | 30 |
| Starch (raw) | lb | 950 |

The formulas using ASP 400 clay substituted for the Kelsize proved to be superior to those with Kelsize in plant runs. Good bond strength was developed and drier, harder boards were produced with the ASP 400 adhesive. In addition, production rates were higher when the ASP 400 was present. For example, the production rate of a particular board was increased from 375 ft. per minute to 450 ft. per minute by use of the ASP 400. In another case, a board comprised of 90 lb. kraft semichemical corrugating medium and 42 lb. kraft, which normally was run at a top speed of 200 ft. per minute, was produced, with the ASP 400 adhesive, at a top speed of 325 ft. per minute with no adverse effect on the glue bond strength. In still another instance, the glue roll clearance was decreased from a normal of .008 in. to .005 in., through the influence of the ASP 400 in the adhesive, with no detrimental effect on the board. This resulted in a considerable saving of adhesive.

These commercial tests clearly pointed up a number of advantages accruing to the process for combining corrugated board through the use of ASP 400 clay in place of a conventional extender in the adhesive. Among these advantages are the following:

(1) Proportion of drier, firmer boards off of the combiner.
(2) Increased production.
(3) Increased mileage per gallon of adhesive with resultant lower cost per unit of glue line.

EXAMPLE VII

This example comprised further plant tests, this time making solid fibre board using a laminating starch adhesive. The formula tested was:

| | Pounds |
|---|---|
| Water | 4,000 |
| Pen Ford Gum #12 | 2,100 |
| ASP 400 | 900 |
| Water | 700 |

This adhesive performed very well on all types of solid fibre board fabrications. Its rheological properties enabled the operators to apply exceptionally smooth, thin films and this resulted in much drier board with less warp than was the case using their conventional adhesive. It was found that the glue roll clearances could be decreased considerably from those required with a similar formula using the conventional extender of this plant, i.e., Aqua Fill, a diatomaceous earth. This reduction of clearances resulted in a coverage of 2.7 lb. of adhesive solids per 1,000 sq. ft. of glue line which compares favorably with the coverage of 4.8 lb. of solids per 1,000 sq. ft. of glue line for the aforementioned adhesive containing Aqua Fill. The formula for the latter adhesive appears below:

| | Pounds |
|---|---|
| Water | 4,500 |
| Pen Ford Gum #12 | 1,800 |
| Aqua Fill | 1,200 |
| NaOH | 9 |

Advantages of using ASP 400 clay as an extender in laminating adhesive, in place of a greater quantity of diatomaceous earth (with caustic), which were clearly brought out by the tests of this example are listed below. These advantages can be attributed in part to improved rheological properties and in part to reduced penetrative tendency, both of which are due to the presence of the ASP 400 clay.

(1) Production of drier, firmer boards.
(2) Reduction in warping.
(3) Increased mileage per gallon of adhesive.
(4) Superior bond strength.
(5) Increased machine speeds.

I claim:

1. A dry composition comprising an adhesive material and kaolin, said kaolin being substantially free of particles coarser than 325 mesh and having a particle size distribution such that not over about 30% by weight consists of particles finer than 2 microns in equivalent spherical diameter and not more than about 15% by weight consists of particles finer than 1 micron in equivalent spherical diameter.

2. The dry composition of claim 1 in which the adhesive material is an amylaceous adhesive material.

3. The dry composition of claim 1 in which the adhesive material is polyvinyl alcohol.

4. The dry composition of claim 1 in which the adhesive material is starch.

5. The dry composition of claim 1 in which the adhesive material is dextrine.

6. The dry composition of claim 1 in which the adhesive material is a mixture of dextrine and polyvinyl alcohol.

7. The dry composition of claim 1 in which the weight ratio of said kaolin to said adhesive material is within the range of from about 1:10 to about 4:1.

8. An adhesive composition comprising an adhesive material, water and kaolin, said kaolin being substantially free of particles coarser than 325 mesh and having a particle size distribution such that not over about 30% by weight consists of particles finer than 2 microns in equivalent spherical diameter and not more than about 15% by weight consists of particles finer than 1 micron in equivalent spherical diameter.

9. The adhesive composition of claim 8 in which the adhesive material is an amylaceous adhesive material.

10. The adhesive composition of claim 8 in which the adhesive material is polyvinyl alcohol.

11. The adhesive composition of claim 8 in which the adhesive material is starch.

12. The adhesive composition of claim 8 in which the adhesive material is dextrine.

13. The adhesive composition of claim 8 in which the adhesive material is a mixture of dextrine and polyvinyl alcohol.

14. The adhesive composition of claim 8 in which the weight ratio of said kaolin to said adhesive material is within the range of from about 1:10 to about 4:1.

15. An adhesive composition comprising starch, water and kaolin, said kaolin being substantially free of particles coarser than 325 mesh and having a particle size distribution such that not over about 30% by weight consists of particles finer than 2 microns in equivalent spherical diameter and not more than about 15% by weight consists of particles finer than 1 micron in equivalent spherical diameter, in which part of the starch is gelatinized and acts as a carrier for the remainder of the starch which is raw.

References Cited in the file of this patent

UNITED STATES PATENTS

| | | |
|---|---|---|
| 1,863,731 | Schorger | June 21, 1932 |
| 2,023,973 | Pierson | Dec. 10, 1935 |
| 2,102,937 | Bauer | Dec. 21, 1937 |
| 2,258,741 | Champion et al. | Oct. 14, 1941 |
| 2,287,161 | Ball | June 23, 1942 |
| 2,333,023 | Manor | Oct. 26, 1943 |
| 2,486,756 | Murphy et al. | Nov. 1, 1949 |
| 2,487,448 | Kingerley | Nov. 8, 1949 |

FOREIGN PATENTS

| | | |
|---|---|---|
| 614,137 | Great Britain | Dec. 9, 1948 |

UNITED STATES PATENT OFFICE
CERTIFICATE OF CORRECTION

Patent No. 2,892,731                                 June 30, 1959

Arlie Wade Claxton

It is hereby certified that error appears in the printed specification of the above numbered patent requiring correction and that the said Letters Patent should read as corrected below.

Column 1, line 28, for "idustry" read -- industry --; column 7, line 52, for "align" read -- algin --; column 8, line 23, for "Proportion" read -- Production --.

Signed and sealed this 23rd day of February 1960.

(SEAL)
Attest:

KARL H. AXLINE
Attesting Officer

ROBERT C. WATSON
Commissioner of Patents